United States Patent [19]

Gardiner et al.

[11] 3,944,397
[45] Mar. 16, 1976

[54] MOTOR FUEL COMPOSITION CONTAINING MANNICH CONDENSATION PRODUCTS

[75] Inventors: Robert A. Gardiner, St. Paul, Minn.; Bruce H. Garth, Newark, Del.

[73] Assignee: E. I. Du Pont de Nemours and Company, Wilmington, Del.

[22] Filed: Mar. 20, 1975

[21] Appl. No.: 560,181

Related U.S. Application Data

[63] Continuation-in-part of Ser. No. 449,062, March 7, 1974, abandoned.

[52] U.S. Cl. .................. 44/58; 44/DIG. 1; 44/73; 44/74; 44/75; 252/392
[51] Int. Cl.² .......................................... C10L 1/22
[58] Field of Search .......... 44/75, DIG. 1, 73, 74, 44/58; 252/392

[56] References Cited
UNITED STATES PATENTS

| | | | |
|---|---|---|---|
| 2,353,192 | 7/1944 | Sargent et al. | 44/75 |
| 3,036,003 | 5/1962 | Verdol | 44/75 |
| 3,269,810 | 8/1966 | Chamot | 44/62 |
| 3,368,972 | 2/1968 | Otto | 44/75 |
| 3,586,629 | 6/1971 | Otto et al. | 44/75 |
| 3,701,640 | 10/1972 | Lease et al. | 44/66 |

FOREIGN PATENTS OR APPLICATIONS

| | | | |
|---|---|---|---|
| 2,209,579 | 7/1923 | Germany | 44/75 |

OTHER PUBLICATIONS

"Quick-Heat Intake Manifolds for Reducing Cold Engine Emissions" by Wm. D. Bond, Soc. of Auto. Eng. Inc., 1972.
"A Bench Technique for Evaluating the Induction System Deposit Tendencies of Motor Gasolines", by Johnson et al., SAE Paper No. 660,783.
"An Introduction System Deposit Technique for Motor Gasolines" by Johnson, et al., Soc. of Automotive Eng., Paper No. 690,758 (1969).

*Primary Examiner*—Daniel E. Wyman
*Assistant Examiner*—Y. Harris-Smith
*Attorney, Agent, or Firm*—James A. Costello

[57] ABSTRACT

A motor fuel composition comprising gasoline and benzyl polyamine of the formula

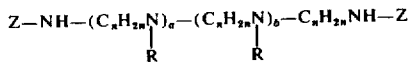

where Z is an alkyl- and hydroxy-substituted benzyl group wherein the alkyl group has 50–1000 carbon atoms and at least 60% of said alkyl group is para to the hydroxyl group, $n$ is 2 to 3, R is hydrogen or Z, and the sum of $a$ and $b$ is 0 to 5, said polyamine being present in an amount sufficient to provide carburetor detergency. Also disclosed is a concentrated solution of said polyamine in a hydrocarbon solvent.

9 Claims, No Drawings

MOTOR FUEL COMPOSITION CONTAINING MANNICH CONDENSATION PRODUCTS

CROSS-REFERENCE TO RELATED APPLICATION

This is a continuation-in-part application of copending application bearing Ser. No. 449,062, filed on Mar. 7, 1974, now abandoned.

BACKGROUND OF THE INVENTION

This invention concerns a motor fuel containing a small amount of a particular Mannich condensation product as an additive to improve certain performance characteristics.

It is known that certain exhaust gas emissions are highest during engine warmup, even for vehicles equipped with emission control devices. To minimize one such emission, i.e. carbon monoxide, it has been found desirable to turn off the choke as soon as possible after the engine is started. To allow early choke turn-off without engine stalling, good fuel evaporation is necessary by the time the choke is turned off. Such good evaporation is achieved by having fuel droplets from the carburetor impinge upon a plate heated by hot exhaust gases. The plate is designed to hold the fuel droplets until evaporation takes place. One difficulty in this method for achieving early fuel evaporation is that the heavy ends of the fuel remaining in contact with the hot surface tend to decompose and form deposits. When sufficient deposists are accumulated, the plate becomes ineffective in vaporizing fuel.

There is a need for an additive to prevent or minimize the formation of deposits on the heated plate, preferably one that will provide more than one performance characterisitc so as to reduce the cost of handling and blending different types of additives. This invention provides such a multifunctional additive, one which provides the desired performance characteristics at low costs.

It has now been found that gasolines having incorporated therein small amounts of the reaction product of an alkyl-substituted phenol, a polyamine and formaldehyde exhibit excellent carburetor detergency, antirust protection, antiicing protection and control of deposits in quick-heat intake manifolds.

SUMMARY OF THE INVENTION

This invention concerns a motor fuel composition containing a relatively small amount of an additive represented by the formula

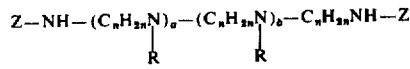

where Z is an alkyl- and hydroxy-substituted benzyl group wherein the alkyl group has 50 to 1000 carbon atoms and wherein at least 60% of the alkyl groups are para to the hydroxyl group, $n$ is 2 to 3, R is hydrogen or Z, $a$ and $b$ are 0 to 5 and the sum $a + b$ is 0 to 5. The additive is therefore an alkyl- amd hydroxy-substituted benzyl derivative of a polyamine. There are at least two alkyl- and hydroxy-substituted benzyl groups on the polyamine. Each of the terminal amino groups of the polyamine is believed to contain one such benzyl group.

DETAILS OF THE INVENTION

The additive is prepared by mixing together alkylphenol, polyamine and formaldehyde and heating them to a temperature sufficient for the reaction to occur, which is in the range of 80° to 200° C. This type of condensation reaction is known as the Mannich reaction and the products obtained are often referred to as Mannich condesation products. The reaction mixture is kept at the reaction temperature until sufficient water of condensation has been evolved and removed. The reaction can be carried out in the absence of a solvent, but it is preferable to use a solvent, preferably one which distills with water azeotropically. Suitable solvents are hydrocarbons boiling in the range of 50° C to 200°C and include hexane, cyclohexane, benzene, toluene, and xylene. The amount of solvent is not critical and can be present at from about 1 to 75% by weight of the total reaction mixture.

The ratio of reactants used will depend upon the particular reaction product desired and can be from two moles each of alkylphenol and formaldehyde per mole of the polyamine to the maximum of one mole each of alkylphenol and formaldehyde for each molar equivalent of amino nitrogen in the polyamine. Thus, with tetraethylenepentamine, which has five amino nitrogens, the alkylphenol and formaldehyde will be from 2 to 5 moles each per mole of tetraethylenepentamine.

The alkyl-substituted phenol is one wherein the alkyl substituent has 50 to 1000 carbon atoms, and at least 60% of the alkyl substituent is para to the phenolic hydroxyl group. While the several methods known in the art for preparing alkylphenols can be used, the method and the reaction conditions should be so chosen that the alkyl substituent in the alkylphenol is at least 60% in the position para to the hydroxyl group. Alkylation of phenol with a monoolefin of 50 to 1000 carbon atoms, using boron trifluoride catalyst, and reaction temperatures of below about 65° C, preferably in the range of 40°–50°C, is the preferred process for the preparation of suitable alkylphenols.

The olefin reactant used to alkylate the phenol is a monoolefin of 50 to 1000 carbon atoms. Such monoolefin will have an average molecular weight of from about 700 to 14,000. The preferred monoolefins are these monoolefins containing 50 to 100 carbon atoms prepared from polymerization of low molecular weight olfeins of 2 to 6 carbon atoms, either as a homopolymer or as a copolymer. The most preferred monolefins have 55 to 75 carbon atoms and are formed from polymerization of propylene.

The alkyl-substituted phenol is preferably a monoalkylphenol but the presence of minor amounts of di- and trialkylphenols is not objectionable. Thus, alkylphenol prepared as described need not be further purified to prepare the reaction products described herein.

The formaldehyde reactant can be free formaldehyde, aqueous solution of formaldehyde or a polymerized form of formaldehyde which can provide monomeric formaldehyde under the reaction conditions. Aqueous formaldehyde is conveniently used.

The polyamine reactant is an alkylenepolyamine represented by the formula

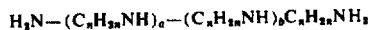

wherein n is 2 to 3, a and b are 0 to 5 and the sum a + b is 0 to 5. Thus, the polyamines are ethylene- and propylenepolyamines and include ethylenediamine, diethylenetriamine, triethylenetetramine, tetraethylenepentamine, pentaethylenehexamine, hexaethyleneheptamine, propylenediamine, dipropylenetriamine, tripropylenetetramine, tetrapropylenepentamine, pentapropylenehexamine, and hexapropyleneheptamine. The ethylenepolyamines are preferred. These polyamines can be prepared by well-known methods of the art such as by the reaction of ethylene or propylenedichloride with ammonia. Most of the above polyamines are commercially available.

When a polyamine which has more than two amino groups is a reactant, and more than two moles each of alkylphenol and formaldehyde per mole of polyamine are used, the internal amino groups can also have alkyl- and hydroxy-substituted benzyl substituents. Depending upon the particular polyamine used, the particular ratio of alkylphenol and formaldehyde to polyamine employed, the reaction product can have none, some, or all of the internal amino groups of the polyamine substituted with an alkyl- and hydroxy-substituted benzyl group. For example, the table below lists the compounds which are believed to be the predominant products when a p-alkyl-phenol, formaldehyde and tetraethylenepentamine are reacted in the indicated ratios.

predominant tetrabenzyl compound, the reaction mixture may also contain some di-, tri- and penta-benzyl compounds. Accordingly, the present invention compositions include mixtures of alkyl- and hydroxy-substituted benzyl polyamines.

It has been found that the present invention compounds are highly effective in controlling deposit formation in quick-heat intake manifolds because: (1) the alkyl substituent has at least about 50 carbon atoms, and (2) at least 60% of the alkyl-substituent is para to the hydroxyl group. When the alkyl group size is substantially less than about 50 carbon atoms and the proportion of the alkyl group para to hydroxyl is less than about 60%, considerably poorer control of deposit is obtained.

The reason for the unexpected effectiveness of the invention compound, as defined, in controlling quick-heat intake manifold deposit is not understood. The alkyl group size of 50 carbon atoms is considerably in excess of the minimum size generally considered to be necessary for gasoline solubility, (which is in the range 8–20 carbon atoms) so gasoline solubility is not a determining factor.

Given the alkyl group of at least 50 carbon atoms, the alkyl- and hydroxy-substituted benzyl polyamines differ in effectiveness in controlling deposit formation depending upon the proportion of para-alkyl compounds

| Alkylphenol/HCHO/Polyamine | | | Predominant Product (R′=alkyl) |
|---|---|---|---|
| 2 | 2 | 1 | 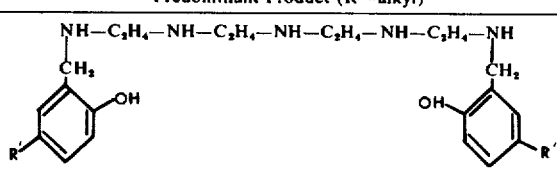 |
| 3 | 3 | 1 | 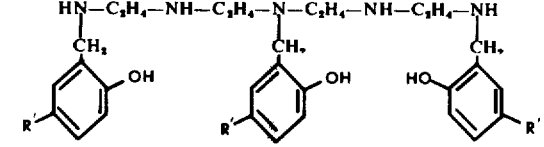 |
| 4 | 4 | 1 | 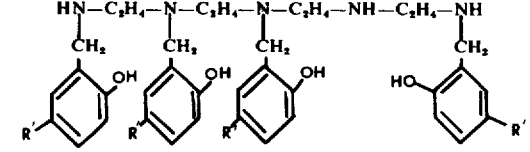 |
| 5 | 5 | 1 | 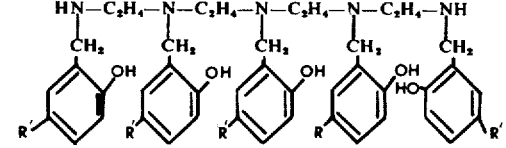 |

As recognized by those skilled in the art, in a condensation reaction of the present type wherein one of the reactants has multiple reaction sites, although one product may predominate, there can also be present other products wherein more or less of the reaction sites have reacted. As an illustration, in the above table wherein the reactant ratio is 4:4:1, in addition to the present. Using a criterion that an additive to be practical should reduce deposits by 40%, the alkyl- and hydroxy-substituted benzyl polyamine should have at least about 60% of the alkyl group para to the hydroxyl group. When the proportion of the alkyl group in the para position is about 78% or more, almost complete elimination of deposits is observed. The reason for this unexpected effectiveness of para alkyl-substituted compounds is not understood.

Gasolines into which the additives of the present invention are incorporated are normally mixtures of hydrocarbons boiling in the gasoline range, usually from about 100° to 425° F. They can consist of straight chain or branched-chain paraffins, cycloparaffins, olefins and aromatic compounds or any mixture of such hydrocarbons obtainable from straight run naphtha, polymer gasoline, natural gasoline, thermally or catalytically cracked hydrocarbon stocks and catalytically reformed stocks. The gasolines can also contain varying amounts of conventional additives such as antiing knock compounds including tetramethyllead, tetraethyllead, mixed alkylleads, scavenging agents, dyes, antioxidants, antiicing agents, rust inhibitors, detergents, antipreignition agents as well as intake valve deposit control additives such as nonvolatile lubricating mineral oils of 500–1500 SUS viscosity at 100° F., and low molecular weight polypropylenes and polybutylenes.

Normally, the gasoline will contain from about 0.001 to about 0.04 percent by weight of the substituted polyamine, i.e., 2.5 to 100 pounds per thousand barrels (ptb), preferably from about 0.005 to 0.03 percent by weight (12.5 to 75 ptb), and most preferably from 0.006 to 0.024 percent by weight (15 to 60 ptb). At about 0.001 percent by weight or less, very little of the beneficial effects of the compounds are observed; while concentrations greater than about 0.04 percent by weight are useful, very little additional benefits are obtained.

To facilitate handling and incorporation into gasoline, the compounds of the invention can be dissolved in suitable solvents. Included are hydrocarbons boiling within the gasoline boiling range, exemplified by benzene, toluene, xylene, hexane, cyclohexane and the like. The solutions will normally contain from 10% to 90% by weight of the compound, preferably 40–80% by weight and most preferably 60 to 80% by weight. The compounds or their solutions can be incorporated into the gasolines by any of the procedures well-known in the art.

The alkyl- and hydroxy-substituted benzyl polyamines provide other performance characteristics in addition to the control of quick-heat intake manifold deposits. Certain of the alkyl- and hydroxy-substituted benzyl polyamines, particularly those which contain unsubstituted secondary amino groups are effective as anticorrosion, carburetor antiicing and carburetor detergent additives.

It is recognized that the degree of activity depends upon many different factors but it has been found in general that the effectiveness of the compounds in controlling quick-heat intake manifold deposit increases with the increasing numbers of alkyl- and hydroxy-benzyl substituents, particularly at higher temperatures. On the other hand, increasing the number of the benzyl substituents decreases the effectiveness of the compounds as anticorrosion, antiicing and carburetor detergent additives.

Thus, a product containing two alkyl- and hydroxy-substituted benzyl groups on a tetraethylenepentamine provides good anticorrosion, carburetor antiicing, carburetor detergency and control of quick-heat intake manifold deposit performance whereas a product containing five such benzyl groups on tetraethylenepentamine, while providing excellent control of quick-heat intake manifold deposit, provides very little antiicing protection.

When a gasoline composition having antirust, antiicing and carburetor detergency properties is desired, the invention compounds of the formula

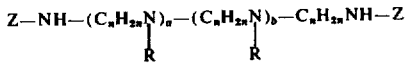

wherein Z, n, R, a and b are as defined, are preferred. The compounds wherein R=H are most preferred. The most preferred compound is tetraethylenepentamine containing two alkyl- and hydroxy-substituted benzyl groups as defined, which is nominally represented by the formula:

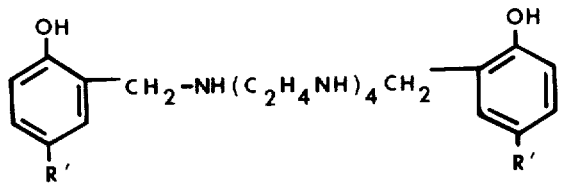

where R' is polypropylene group of about 60 carbon atoms.

When a gasoline composition having carburetor detergency and quick-heat intake manifold deposit control properties is desired, the compounds of the above formula wherein at least one of the R group is Z are preferred. The preferred compound is tetraethylenepentamine containing three alkyl- and hydroxy-benzyl groups as defined which is nominally represented by the formula

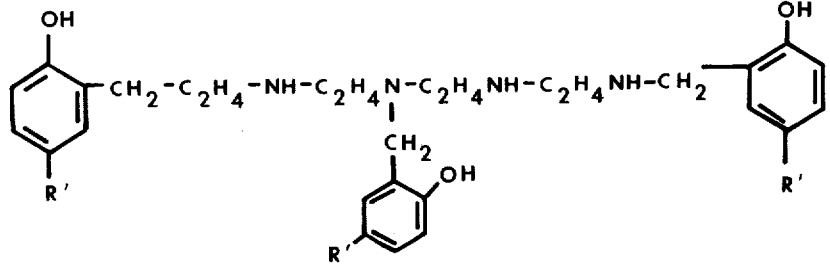

where R' is polypropylene group of about 60 carbon atoms.

PREPARATION A.
ALKYLPHENOL/FORMALDEHYDE/POLYAMINE CONDENSATION PRODUCT

Polypropylenephenol (polypropylene M.W. 840) containing 74% para-polypropylene substituent, 5,300 grams, tetraethylenepentamine 410 grams, and toluene 1,775 grams were placed in a reactor, and 492 grams of 36% aqueous formaldehyde was added over a period of 90 minutes. The reaction mixture was refluxed for 11 hours, during which period 430 ml. of water was separated. An additional 91 grams of 36% aqueous formaldehyde was added and the reaction mixture was refluxed for two hours more during which time an additional 80 ml of water was separated. The reaction mixture which consisted of 70% of the product in toluene was filtered through diatomaceous earth.

This toluene solution can be incorporated directly into gasoline but, in the embodiment described, the product was isolated by removing toluene. Elemental analysis of the recovered product showed 2.5% nitrogen. Molecular weight: 2013. Theoretical values for tetraethylenepentamine containing two benzyl groups having a hydroxyl and an alkyl group of 840 molecular weight substituents are 3.4% nitrogen and a molecular weight of 2049.

Some of the alkyl- and hydroxy-substituted benzyl polyamine containing different amounts of benzyl groups prepared by using a procedure essentially as described above are listed below. In each case the desired product is obtained by choosing the proper molar ratios of polypropylenephenol, formaldehyde and polyamine. The polypropylenephenol (polypropylene M.W. 840) contained at least 60% of the polypropylene group in the para position.

| | Mole Ratio of Polypropylenephenol:HCHO:Polyamine | Polyamine |
|---|---|---|
| Preparation B | 2:2:1 | ethylenediamine |
| Preparation C | 1:1:1 | triethylenetetramine |
| Preparation D | 2:2:1 | triethylenetetramine |
| Preparation E | 3:3:1 | triethylenetetramine |
| Preparation F | 4:4:1 | triethylenetetramine |
| Preparation G | 1:1:1 | tetraethylenepentamine |
| Preparation H | 2:2:1 | tetraethylenepentamine |
| Preparation I | 3:3:1 | tetraethylenepentamine |
| Preparation J | 5:5:1 | tetraethylenepentamine |

As is generally expected of highly polar gasoline additives, certain of the present benzyl polyamines lead to increased intake valve deposits. The effect upon deposit weight appears to be greater at the lower end of the above disclosed use concentration range, the effect decreasing as concentration is increased.

Thus, for example, in a bench test designed to measure intake valve deposit formation, Preparation H at 15 lbs/1000 bbls (PTB) gives a deposit weight increase of 2.3 times that evident using the base fuel alone. It can be postulated, therefore, that concentrations of benzyl polyamine between 2.5 up to (something less than) 15 PTB will give deposit weight increases of more than 2.3 times that evident using the base fuel alone. At 75 PTB the deposit weight is 1.5 times that of the base fuel control.

In an engine test, 20 PTB of Preparation H gives an average of 4.5 grams/valve deposit weight vs. 2.0 g/valve deposit weight for base gasoline alone. At 100 PTB, the deposit weight is 2.5 g/valve.

The intake valve deposit increases caused by using the additives at relatively low concentrations are not excessive for proper engine performance. In any event, the deposits can be reduced if desired to approximately the control values by (1) using higher concentrations of the disclosed additives, and/or by (2) incorporating into the gasoline such known intake valve deposit control agents as non-volatile mineral lubricating oils of 500 to 1500 SUS at 100° F. and low molecular weight polypropylenes and polybutylenes.

EXAMPLES 1 to 10

The effectiveness of the described alkyl- and hydroxy-substituted benzyl polyamines in controlling quick heat intake manifold deposits was measured by the technique for evaluating induction system deposits (ISD) described by Johnston et al. in SAE Transactions, Volume 75 (1967), Paper No. 660,783. Good correlation between the results obtained by this technique and the tendency of motor gasoline to form deposits in the induction systems of spark-ignition engines is known.

The procedure consists of spraying gasoline and air onto a heated tared metal tube. At the conclusion of the test, the metal tube is removed from the apparatus, washed with heptane and weighed. The weight of the deposit to the nearest 0.1 mg. indicates the deposit-forming tendency of the fuel in the induction system.

In the present series of tests, the motor fuel was Indolene which additionally contained 10 volume percent of 10% Indolene bottoms to increase the deposit-forming capability of the gasoline. The tests were carried out at 350° F., 450° F. and 550° F. to reflect the several thermal conditions believed present in the induction system of the modern automobile engines.

The results summarized below are expressed in terms of percent reduction in deposit weight compared to the deposit weight obtained with the base fuel. The control weights are 3.8 mg. at 350° F., 3.0 mg. at 450° F., and 2.6 mg. at 550° F. Deposit reductions of 90% or more represent substantially complete elimination of deposits. Generally, the difference between a weight reduction of 90 or greater and 100% represents the weight contributed by the additive, present on the metal tube as a clear film.

INDUCTION SYSTEM DEPOSIT TESTS

Fuel: Indolene + 10 Vol. % 10% Indolene Bottoms

| Example No. | Polyamine Prep. | Treating Level PTB | Deposit Weight Change Tube Temperature | | |
|---|---|---|---|---|---|
| | | | 350°F. | 450°F. | 550°F. |
| 1 | B | 20 | −88 | −30 | |
| 2 | B | 50 | | −93 | −17 |
| 3 | D | 20 | −91 | +12 | |
| 4 | E | 20 | −95 | | |
| 5 | F | 50 | | −90 | |
| 6 | H | 20 | −90 | +20 | |
| 7 | H | 50 | | −41 | |
| 8 | I | 20 | −95 | +7 | |
| 9 | I | 50 | | −95 | −14 |
| 10 | J | 20 | −92 | −97 | |
| Comp. A | C | 20 | −34 | +29 | |
| Comp. B | G | 20 | −27 | +18 | |

PTB = Pounds per thousand barrels of the additive in base gasoline.
Comp. = Comparative Example.

The above results show that the described alkyl- and hydroxy-substituted benzyl polyamines provide excellent control of fuel-derived deposits at 350° F at 20 pounds per thousand barrels and at 450° F at 50 pounds per thousand barrels. Comparative Examples A and B show the criticality of having at least two substituted benzyl groups on the polyamine molecule.

EXAMPLES 11 to 13

These Examples and Comparative Examples demonstrate the criticalities of (1) alkyl size and (2) the alkyl content para to the hydroxyl group in the benzyl substituents for controlling induction system deposits. A reduction of at least 40% in deposit weight in the ISD bench technique described previously is used as the criterion for effective deposit control. The substituted benzyl polyamines used in these examples were prepared from polypropylenephenol (M.W. of polypropylene=840) and tetraethylenepentamine reacted in such proportions that the polyamines each contained two benzyl groups. The p-$C_4$ and p-$C_9$ alkyl derivatives at comparative Examples E and F were prepared from p-t-butylphenol and p-nonyl-phenol. The $C_{36}$ alkyl derivative of Comparative Example G was prepared from poly-n-butenylphenol (M.W. of poly-n-butylene=500). The additives were added at a concentration of 20 pounds per thousand barrels to Indolene containing 10 volume percent of Indolene bottoms.

INDUCTION SYSTEM DEPOSIT TESTS
EFFECTS OF ALKYL SIZE AND % PARA-SUBSTITUTION

Fuel: Indolene + 10 Vol. % 10% Indolene Bottoms

| Example No. | Alkyl Group | % Para | Deposit Weight Change Tube Temperature 350°F. |
|---|---|---|---|
| Comp. C | $C_{60}$ | 24 | − 18 |
| Comp. D | $C_{60}$ | 57 | − 35 |
| 11 | $C_{60}$ | 67 | − 95 |
| 12 | $C_{60}$ | 80 | − 90 |
| 13 | $C_{60}$ | 85 | − 95 |
| Comp. E | $C_4$ | 100 | +106 |
| Comp. F | $C_9$ | 100 | + 31 |
| Comp. G | $C_{36}$ | ~90 | + 3 |

The above results show that both the size of the alkyl groups and the para location of the alkyl groups are necessary for the control of fuel-derived induction system deposits. Comparative Examples C and D show that the polyamines containing benzyl groups with alkyl groups of 60 carbon atoms do not provide good deposit control when relatively low percentages of the alkyl groups are para to the hydroxyl group. Comparative Examples E and F show that even when all the alkyl groups are para to the hydroxyl, no deposit control is obtained when the alkyl groups are small. In short, the comparison of Examples 11–13 with comparative Examples C and D shows that it is necessary that at least 60% of the alkyl groups be para to hydroxyl in order to effectively control deposits in quick-heat intake manifolds.

EXAMPLES 14–21

The effectiveness of the alkyl- and hydroxy-substituted benzyl polyamines in controlling induction system deposits, particularly quick-heat intake manifold deposits was determined on an engine stand. A quick-heat intake manifold is provided by a heated plate positioned directly below a carburetor. The surface of the plate is designed to hold the fuel droplets until evaporation takes place. This type of quick-heat intake manifold has been designated an early fuel evaporation (EFE) system. In the present tests, the EFE plate is heated electrically. The central portion of the plate is kept at about 300° F., the outer edges at about 400° F., giving an average plate temperature of about 350° F.

The EFE plate is positioned directly below a carburetor equipped with a riser, the end of the riser being about one inch from the surface of the plate. The deposit-forming tendency of a fuel is determined by measuring the rate of temperature rise of the EFE plate surface by a thermocouple lead placed thereon. As deposits accumulate, the efficiency of the plate to vaporize fuel decreases and is accompanied by a rise in the plate surface temperature. Thus, in the absence of deposit formation, the rate of temperature rise is zero.

In the present tests, the engine is operated for 46 hours. The average rate of temperature increase is determined and used as a measure of fuel-derived deposits. Additionally, after the tests, the EFE plate is visually rated for the degree of dirtiness. The results are summarized below.

EFE PLATE DEPOSITS
ENGINE STAND TESTS

| Example No. | Additive | Treating Level PTB[1] | Additional Carrier (PTB) | Temp. Rise °F/Hr. |
|---|---|---|---|---|
| Control Base Fuel | — | — | — | 2.9 |
| 14 | H | 20 | — | 0.8 |
| 15 | H | 50 | — | 0.8 |
| 16 | I | 20 | — | 0.8 |
| 17 | I | 50 | — | 0 |
| 18 | J | 50 | — | 0 |
| 19 | B | 50 | — | 0.5 |
|  | — | — | [2]SEB-78 Oil (370) | 0.8 |
| 20 | H | 20 | SEB-78 Oil (250) | 0.6 |
| 21 | I | 20 | SEB-78 Oil (250) | 0.1 |

[1]PTB = Pounds per thousand barrels of additive in gasoline.
[2]Top cylinder oil, solvent extracted bright stock 29.5° API Gravity, viscosity at 100°F, 763 SUS, viscosity at 210°F, 78 SUS.

The above results show that the described alkyl- and hydroxy-substituted benzyl polyamines are very effective in controlling quick-heat intake manifold deposits. Comparing Example 16 with 17 and 18 shows that better control of deposits is obtained with the greater number of the substituted benzyl groups on the same polyamine. The use of carrier oil (SEB-78) with the polyamine also appears to be beneficial in controlling deposits. In all cases wherein the rate of temperature rise is less than that of the control, visual inspection of the EFE plates showed cleaner plates than the control.

EXAMPLES 22 to 27

The effectiveness of alkyl- and hydroxy-substituted benzyl polyamine of the invention in keeping a carburetor clean (carburetor detergency) was demonstrated in a carburetor keep-clean test (Onan) carried out in a single cylinder engine to which a controlled amount of exhaust gas from another engine is mixed with the air supplied to the test carburetor. The test carburetor throat consists of a two-piece stainless steel liner fitted around the throttle plate shaft. The liner is removable for inspection and rating. The engine is operated under cycling conditions of one minute idling and three minutes of part throttle over a two hour test period. A visual rating scale of 10 for a clean carburetor and 0 for a very dirty carburetor is used. A rating of 7 or greater is considered satisfactory. The results are summarized below.

CARBURETOR KEEP CLEAN TEST (ONAN)

| Example No. | Additive | Treating Level(PTB) | Rating |
|---|---|---|---|
| Control | None | — | 4.7 |
| 22 | H | 5 | 7.3 |
| 23 | H | 20 | 8.9 |
| 24 | H | 50 | 8.3 |
| 25 | I | 5 | 7.1 |
| 26 | I | 20 | 8.7 |
| 27 | I | 50 | 8.1 |

These results show that the alkyl- and hydroxy-substituted benzyl polyamines are highly effective carburetor detergents. Satisfactory carburetor keep-clean performances are obtained at a treating level of as low as 5 pounds per thousand barrels. The results also show that going from a polyamine containing two benzyl groups (H) to a polyamine containing three benzyl groups (I), slightly decreases carburetor detergency.

EXAMPLES 28 to 30

Carburetor detergency of the compounds of the invention was further demonstrated in tests carried out in a 1973 Buick Electra having a 455 CID engine equipped with an exhaust gas recirculation (EGR) system. The vehicle was subjected to 6,000 miles AMA test cycles on a programmed chassis dynamometer (PCD). The test cycle includes periods of idle, acceleration, cruise and deceleration to simulate typical urban driving. The base fuel was Indolene with two grams per gallon of tetraethyllead antiknock compound. After the 6,000 miles test, the primary and the secondary throttle areas were visually rated. The results are summarized below.

invention was demonstrated in a 6-cylinder Chevrolet engine of 230 cubic inch displacement. Two types of carburetor were used, (a) a throttle plate carburetor and (b) an emulsion type carburetor. The environment of the carburetor was maintained at 40° F. and 95% relative humidity.

In the throttle plate carburetor (Stromberg) tests, the engine was run on a two-part cycle, namely 20 seconds with open throttle at an engine speed to 1,600 rpm at 10 seconds with the throttle almost closed at 400 rpm (idling). During the test, ice forms on the throttle plate and surrounding carburetor wall and causes the engine to stall by blocking the flow of air when the throttle plate is almost closed during idling. With a typical winter-grade gasoline, engine stalling occurs in about 3–5 cycles. An additive is considered effective if it prevents stalling to about 10 cycles; it is considered excellent if it prevents stalling to at least about 25 cycles.

In the emulsion tube type carburetor test, a Solex, Model No. 32 PBICA single barrel, down draft carburetor replaced the throttle plate carburetor. The engine was operated for 20 minutes at an initial speed of 1,500 rpm and the reduction in engine speed was used as a CARBURETOR DETERGENCY
6,000 Miles AMA-PCD Tests
1973 Buick Electra, 455 CID Engine with EGR
Fuel: Indolene + 2 Grams Antiknock

| Example No. | Additive | Treating Level PTB | G/Valve | Intake Valves CRC[1] | STEM[2] | Carburetor Rating Primary | Secondary |
|---|---|---|---|---|---|---|---|
| Control Base Gas | — | — | 2.0 | 6.7 | 6.6 | Dirty | Heavy Deposits |
| 28 | H | 20 | 4.5 | 5.5 | 4.5 | Clean | Clean |
| 29 | H | 100 | 2.5 | 5.6 | 8.7 | Clean | Clean |
| 30 | H + SEB-78 (250PTB) | 20 | 2.2 | 6.3 | 8.6 | Clean | Amber Film |

[1] - Cooperative Research Council Rating of Valve Tulips, 10 = clean.
[2] - A stem rating of 10 = clean.

The above results show that the compounds of the invention are highly effective in keeping the throttle areas of a carburetor clean.

EXAMPLES 31 to 37

The antiicing effectiveness of the compounds of the invention measure of the effectiveness of the antiicing agent. Under these conditions the engine does not stall completely. With a typical winter-grade gasoline the engine speed may decrease about 600 rpm during the 20 minute test period. A reduction of not more than 50 rpm is considered excellent antiicing performance. The test results are summarized below.

CARBURETOR ANTIICING TESTS

| Example No. | Carburetor | Additive | Treating Level PTB | Mid-Boiling Point of Gasoline Used °F. | Anti-icing Benefits[3] |
|---|---|---|---|---|---|
| Control | Solex[1] | None | — | 182 | −600 rpm |
| 31 | Solex | H | 45 | 182 | −115 rpm |
| 32 | Solex | H | 50 | 182 | −10 rpm |
| Control | Solex | None | — | 197 | −500 rpm |
| 33 | Solex | H | 40 | 197 | −230 rpm |
| 34 | Solex | H | 45 | 197 | −30 rpm |
| Control | Stromberg[2] | None | — | 197 | 4 Cycles to stall |
| 35 | Stromberg | H | 30 | 197 | 12 Cycles to stall |
| 36 | Stromberg | H | 40 | 197 | 14 Cycles to stall |
| 37 | Stromberg | H | 45 | 197 | 25+Cycles to stall |
| 38 | Stromberg | I | 100 | 197 | 4 Cycles tp stall |

PTB = Pounds per thousand barrels.
[1] Emulsion tube type carburetor
[2] Throttle plate type carburetor
[3] Decrease of less than 50 rpm considered excellent for emulsion tube carburetor. 25 Cycles to stall considered excellent for throttle plate carburetor.

The above results show that the alkyl- and hydroxy-substituted benzyl polyamines of the invention provide excellent antiicing protection when used at 45 to 50 pounds per thousand barrels and good protection at 30 pounds per thousand barrels. Example 38 shows that the addition of a third benzyl group to compound H is detrimental to antiicing performance.

EXAMPLES 38 to 41

The antirust properties of the products of the invention were determined according to the method of ASTM D665, Procedure A. In this test, 300 ml. of the hydrocarbon fuel containing the additive under test is stirred with 30 ml. of distilled water at a temperature of 32° C. (90° F.) with a cylindrical steel specimen completely immersed therein. The test is carried out for 20 hours. The results are summarized below.

| | ANTIRUST PROTECTION | | | |
|---|---|---|---|---|
| Example No. | Additive | Treating Level PTB | % Rust In Isooctane | % Rust In RE117B |
| | None | — | 40 | 70 |
| 39 | H | 5 | 0 | 0 |
| 40 | H | 10 | 0 | 0 |
| 41 | H | 20 | 0 | 0 |

The above results show that the alkyl- and hydroxy-substituted benzyl polyamine of the invention provides excellent antirust protection at 5 pounds per thousand barrels.

The embodiments of the invention in which an exclusive property or privilege is claimed are defined as follows:

1. A motor fuel composition comprising a major amount of hydrocarbons boiling in the gasoline range and a minor amount, sufficient to provide detergency, of a benzyl polyamine of the formula $$Z-NH-(C_nH_{2n}N)_a-(C_nH_{2n}N)_b-C_nH_{2n}NH-Z$$
$$\quad\quad\quad\quad\quad\; |\quad\quad\quad\; |$$
$$\quad\quad\quad\quad\quad R\quad\quad\; R$$

where Z is an alkyl- and hydroxy-substituted benzyl group wherein the alkyl group has 50 to 1000 carbon atoms and wherein at least 60% of said alkyl group is para to the hydroxyl group, n is 2 to 3, R is hydrogen or Z, $a$ and $b$ are 0 to 5 and the sum $a + b$ is 0 to 5.

2. The motor fuel composition of claim 1, the benzyl polyamine having the formula wherein $n$ is 2, $a + b$ is 0 to 3 and the alkyl group has 50 to 100 carbon atoms.

3. The motor fuel composition of claim 2 wherein each R is H.

4. The motor fuel composition of claim 2 wherein at least one R is Z.

5. The motor fuel composition of claim 1 wherein said benzyl polyamine constitutes about 0.001–0.04% by weight of the composition.

6. An additive composition for addition to gasoline comprising from 10 to 90 percent by weight of the benzyl polyamine of claim 1 in a hydrocarbon solvent.

7. The additive composition of claim 6 wherein $n$ is 2, $a + b$ is 0 to 3 and the alkyl group has 50 to 100 carbon atoms.

8. The additive composition of claim 6 wherein each R is H.

9. The additive composition of claim 6 wherein at least one R is Z.

* * * * *